H. FISH.
TOOL HOLDER.
APPLICATION FILED AUG. 19, 1910.
996,709.
Patented July 4, 1911.
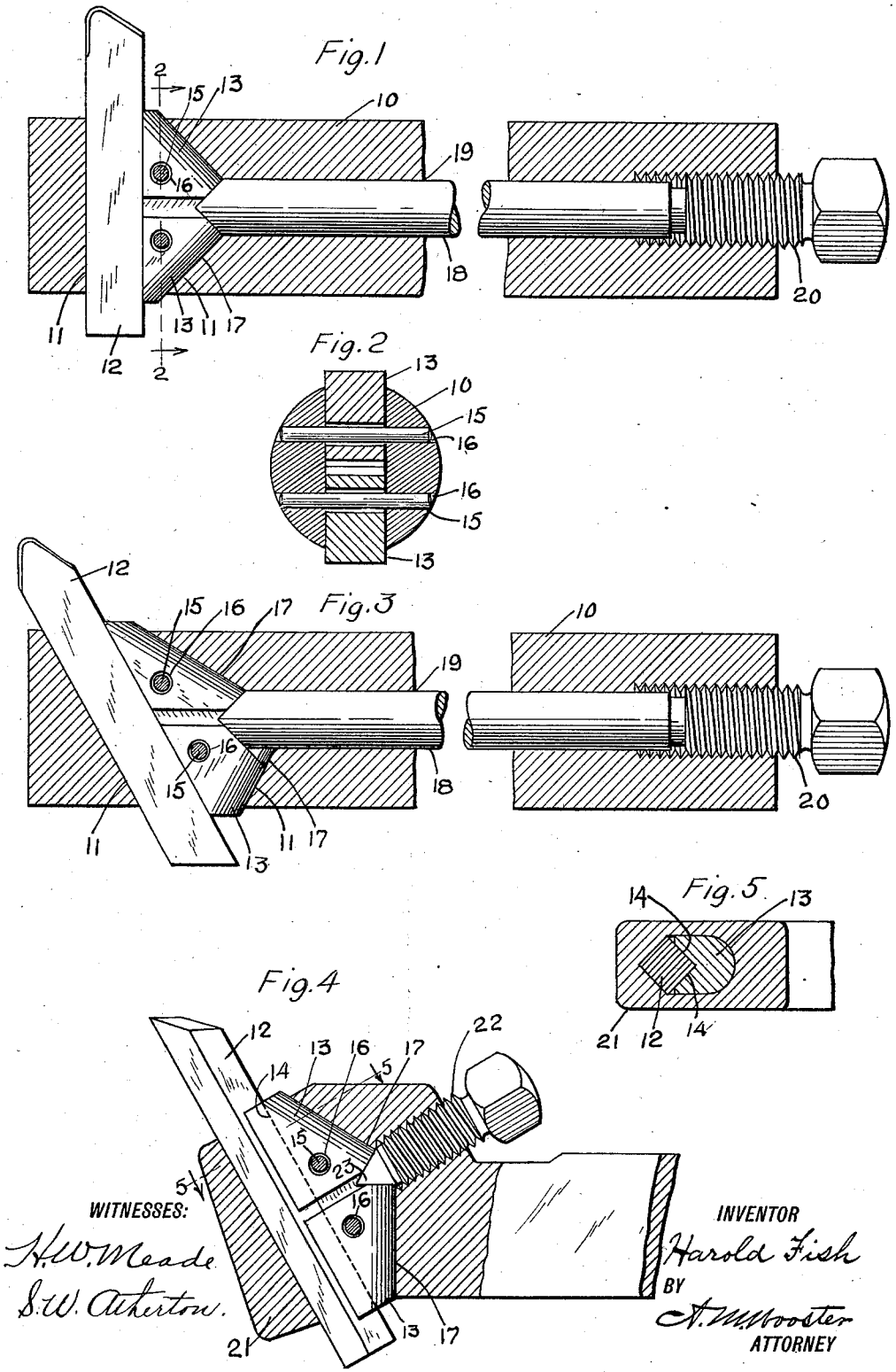

UNITED STATES PATENT OFFICE.

HAROLD FISH, OF STRATFORD, CONNECTICUT.

TOOL-HOLDER.

996,709.  Specification of Letters Patent.  Patented July 4, 1911.

Application filed August 19, 1910. Serial No. 578,021.

*To all whom it may concern:*

Be it known that I, HAROLD FISH, a citizen of the United States, residing at Stratford, county of Fairfield, State of Connecticut, have invented an Improvement in Tool-Holders, of which the following is a specification.

This invention has for its object to provide a simple and inexpensive tool holder which is adapted to carry the various styles of tools used upon lathes, planers and shapers, which may be easily and quickly operated to grip or release a tool and which will hold either angular or round-shank tools with absolute rigidity so that they can not be moved under the severest strains of use.

With these and other objects in view I have devised the novel tool holder which I will now describe, referring to the accompanying drawing forming a part of this specification and using reference characters to indicate the several parts:

Figure 1 is a longitudinal section of the body of my novel tool holder showing the set screw, plunger, wedge blocks and tool in elevation; Fig. 2 a section on the line 2—2 in Fig. 1, looking in the direction of the arrows; Fig. 3 a longitudinal section corresponding with Fig. 1 and showing a variant form of the invention; Fig. 4 a view partly in elevation and partly in longitudinal section, illustrating another variant form of the invention, which is especially adapted for metal shapers; and Fig. 5 a section on the line 5—5 in Fig. 4, looking in the direction of the arrows.

10 denotes the body of my novel tool holder which is provided at its forward end with a recess 11, with inclined rear walls, which receives the tool, indicated by 12, and wedge blocks, indicated by 13, which are provided with correspondingly inclined rear walls. It is of course immaterial so far as the principle of the invention is concerned, whether the tool is set transversely to the longitudinal plane of the body as in Fig. 1, or obliquely thereto as in Figs. 3 and 4.

In Figs. 1 and 3 I have illustrated a square-shanked boring tool carried at different angles and in Fig. 4 I have illustrated a diamond-point tool carried obliquely to the longitudinal plane of the body. The operative faces of the wedge blocks may be made flat, as in Figs. 1 and 3, or may be provided with recesses 14 variously shaped to receive round or angular shanks of tools, as in figure 4. In order to prevent the wedge blocks from dropping out when there is no tool in the holder, I retain them loosely therein by means of pins 15 which engage the holder with a drive fit and pass through relatively large holes 16 in the wedge blocks so that while the wedge blocks are retained securely in place in the body they are free to move in the recess in gripping or releasing a tool. In Figs. 1 and 3, I have shown the wedge blocks as provided at their rear ends with inclines 17 which are engaged by corresponding inclines at the forward end of a plunger 18 lying in a longitudinal hole 19 in the body. At the rear end of the body is a set screw 20, the inner end of which is adapted to engage the outer end of the plunger and force it into engagement with the inclines on the wedge blocks, the effect of which is to cause the operative faces of the wedge blocks to bear their entire length upon the tool and to crowd the tool against the wall of the recess, the wedge blocks being forced apart by the plunger and being wedged between the contiguous walls of the recess and the tool, so that strain upon the tool is taken up by what is practically a solid mass of metal. In other words, strain upon the tool in use is transmitted to the wedge blocks with a wedging action and is taken up by the wedge blocks, the body and the plunger.

In the form illustrated in Fig. 4, the action is substantially the same although the construction differs in details. The longitudinal holes in the body and the plunger are dispensed with. The body is provided with a head 21 and the set screw 22 is provided with a conical point 23 which engages correspondingly-shaped recesses in the rear ends of the wedge blocks which take the place of the inclines in the other forms.

The operation will be obvious from the drawing. When the set screw is turned slightly backward so that neither the plunger in the first and second forms nor the conical point of the set screw in the third form bears upon the wedge blocks, the latter are quite loose and a tool may be readily inserted or removed, the wedge blocks, however, being retained in the recess in the body by means of the pins. Having placed a tool in position, the set screw is turned in tightly and either the plunger or the conical head of the screw, if that form is used, will crowd the wedge blocks apart, wedging them between the shank of the tool and the inclined walls of the recess in the body, locking the tool rigidly in place.

Having thus described my invention I claim:

1. A tool holder comprising a body having a recess with inclined rear walls, which is adapted to receive the shank of a tool, wedge blocks in said recess and means for crowding said wedge blocks apart and causing them to engage the walls of the recess and the shank of the tool with a wedging action.

2. A tool holder comprising a body having a recess with inclined rear walls, which is adapted to receive the shank of a tool, wedge blocks, means for loosely retaining the wedge blocks in the recess and means for crowding said wedge blocks apart and causing them to engage the walls of the recess and the shank of the tool with a wedging action.

3. A tool holder comprising a body having a recess with inclined rear walls, which is adapted to receive the shank of a tool, wedge blocks in said recess, a plunger engaging the wedge blocks to crowd them apart and a set screw for moving the plunger forward.

4. A tool holder comprising a body having a recess with inclined rear walls which is adapted to receive the shank of a tool, wedge blocks having inclines at their rear ends, a plunger having corresponding inclines and means for forcing the plunger forward, for the purpose set forth.

5. A tool holder comprising a body having a recess with inclined rear walls, which is adapted to receive the shank of a tool, wedge blocks in said recess having holes through them, pins passing through said holes loosely and engaging the body, for the purpose set forth, and means for actuating the wedge blocks to lock a tool in the holder.

In testimony whereof I affix my signature in presence of two witnesses.

HAROLD FISH.

Witnesses:
A. M. WOOSTER,
S. W. ATHERTON.

---

Copies of this patent may be obtained for five cents each, by addressing the "Commissioner of Patents, Washington, D. C."